(12) United States Patent
Chambers et al.

(10) Patent No.: US 7,782,375 B2
(45) Date of Patent: Aug. 24, 2010

(54) MOBILE COMMUNICATION DEVICE HAVING PANORAMIC IMAGEMAKING CAPABILITY

(75) Inventors: Michael J. Chambers, Erlangen (DE); Michael Kiessling, Freising (DE)

(73) Assignee: Agere Systems Inc., Allentown, PA (US)

( * ) Notice: Subject to any disclaimer, the term of this patent is extended or adjusted under 35 U.S.C. 154(b) by 679 days.

(21) Appl. No.: 11/575,856

(22) PCT Filed: Sep. 23, 2004

(86) PCT No.: PCT/US2004/031193

§ 371 (c)(1), (2), (4) Date: Jul. 13, 2007

(87) PCT Pub. No.: WO2006/041443

PCT Pub. Date: Apr. 20, 2006

(65) Prior Publication Data
US 2007/0279481 A1 Dec. 6, 2007

(51) Int. Cl.
H04N 5/262 (2006.01)
H04N 5/225 (2006.01)
H04N 7/00 (2006.01)
H04W 24/00 (2009.01)
G03B 37/02 (2006.01)

(52) U.S. Cl. .................. 348/239; 348/335; 348/36; 348/37; 455/456.1

(58) Field of Classification Search .............. 348/218.1, 348/36, 37, 39, 239, 335, 38; 455/457, 456.1, 455/66.1, 347, 434; 352/69; 396/20
See application file for complete search history.

(56) References Cited

U.S. PATENT DOCUMENTS

| 5,550,754 | A | 8/1996 | McNelley et al. |
| 6,532,035 | B1 * | 3/2003 | Saari et al. ................ 348/14.02 |
| 6,714,249 | B2 * | 3/2004 | May et al. .................... 348/373 |
| 6,795,715 | B1 * | 9/2004 | Kubo et al. ............... 455/556.1 |
| 6,904,298 | B2 | 6/2005 | Arai et al. |
| 6,947,076 | B1 * | 9/2005 | Kitaguchi et al. ......... 348/218.1 |
| 7,010,158 | B2 * | 3/2006 | Cahill et al. ................ 382/154 |
| 7,724,286 | B2 * | 5/2010 | Shioya et al. ............... 348/239 |

(Continued)

FOREIGN PATENT DOCUMENTS

JP 05100335 A 4/1993

(Continued)

OTHER PUBLICATIONS

Examiner Office Letter dated Aug. 28, 2009; Japanese Patent Application No. 2007-533441; 5 pages.

*Primary Examiner*—Tuan Ho
*Assistant Examiner*—Marly Camargo

(57) ABSTRACT

A mobile communication device, in particular a mobile telephone, a PDA or a MDA. In one embodiment, the mobile communication device includes: (1) a main body and (2) a camera module, coupled to the main body and configured for rotation relative to the main body about at least one axis of rotation. In another embodiment, the main body has a camera module mechanical interface, the camera module has a main body mechanical interface that is complementary to the camera module mechanical interface and the camera module is configured to be removably coupled to the main body and further configured for rotation relative to the main body about at least one axis of rotation.

11 Claims, 3 Drawing Sheets

U.S. PATENT DOCUMENTS

| | | | |
|---|---|---|---|
| 2004/0095500 A1 * | 5/2004 | Sato et al. | 348/340 |
| 2005/0014527 A1 * | 1/2005 | Chambers et al. | 455/556.1 |
| 2006/0064273 A1 | 3/2006 | Sugiura et al. | |
| 2006/0105806 A1 * | 5/2006 | Vance et al. | 455/556.1 |
| 2008/0095526 A1 * | 4/2008 | Chang | 396/429 |

FOREIGN PATENT DOCUMENTS

| | | | |
|---|---|---|---|
| JP | 10075287 A * | 3/1998 | |
| JP | 2000324380 A | 11/2000 | |
| JP | 2001142167 A | 5/2001 | |
| JP | 2002057919 A | 2/2002 | |
| JP | 2002094635 A * | 3/2002 | |
| JP | 2003051872 A | 2/2003 | |
| JP | 2005275126 A * | 10/2005 | |
| WO | WO2006041443 A1 | 4/2006 | |

* cited by examiner

MOBILE COMMUNICATION DEVICE HAVING PANORAMIC IMAGEMAKING CAPABILITY

CROSS-REFERENCE TO FOREIGN APPLICATION

This application is the National Stage of, and therefore claims the benefit of, International Application No. PCT/US2004/031193 filed on Sep. 23, 2004, entitled "MOBILE COMMUNICATION DEVICE HAVING PANORAMIC IMAGEMAKING CAPABILITY," which was published in English under International Publication Number WO 2006/041443 A1 on Apr. 20, 2006 and is incorporated herein by reference in its entirety.

TECHNICAL FIELD OF THE INVENTION

The present invention is directed, in general, to mobile communication devices and, more specifically, to a mobile communication device having a panoramic imagemaking capability.

BACKGROUND OF THE INVENTION

A dramatic type of photography involves the capturing of panoramic images. The first panoramic pictures, taken in the 1840s, were composed by joining a series of separate daguerrotype images. By and large, panoramic images continued to be made this way for over a hundred and fifty years. While special panoramic cameras exist, they are purpose-built and therefore not suitable for making nonpanoramic, "standard," images. Special panoramic cameras are therefore considered novelties of limited use.

Assuming one has only a nonpanoramic camera to create a panoramic image, digital photography and photograph manipulation computer software (e.g., Adobe Photoshop) have come together to make the task of joining separate pictures together easier, resulting in more "seamless" panoramic images. However, it is still necessary to capture a series of digital images while rotating the camera around a single axis of rotation, to transfer these images to a personal computer (PC) and to join the separate images into a panoramic image by means of a suitable software. The user therefore needs to be familiar with the PC and the photograph manipulation software.

Because a single axis of rotation is required, a tripod is indispensable for all but the steadiest and most experienced hands. In fact, a standard tripod is generally not sufficient for such purposes, but instead a tripod equipped with a specialized turntable is needed. A exemplary turntable that can be used for this purpose is described in U.S. Patent Application Number 20030128975 A1, entitled "Multi-purpose Turntable for Creation of Three Dimensional Pictures."

One of the greatest benefits of digital photography is the possibility to see the image almost immediately after it has been captured. Thus, multiple images of the same object can be taken and only the best kept. However, in the case of panoramic images, it being necessary to process the captured images by means of a PC, the final result cannot be judged at the time when taking the photographs. Therefore, the benefit of image immediacy does not apply when capturing panoramic images. Further, since the required apparatus includes a PC, portability is difficult and spontaneity is probably impossible.

At the same time mobile communication devices are increasingly used for more than just speech communication. A variety of applications, such as messaging services, data communication, e-mail or fax services, have become available to the users of mobile communication devices.

The ongoing development in digital imaging devices furthermore makes it possible today to equip mobile communication devices with digital cameras at affordable prices, whereby new multimedia services become available. So it is possible to take digital photographs and send them to a friend by means of the Multimedia Message System (MMS). It is even possible to record video clips and send them by means of an MMS.

Accordingly, what is needed in the art is a better way to create panoramic images. More particularly, what is needed in the art is a way to make panoramic images that substantially preserves the flexibility, portability and spontaneity of standard cameras.

SUMMARY OF THE INVENTION

To address the above-discussed deficiencies of the prior art, the present invention provides a mobile communication device, in particular a mobile telephone, a PDA or a MDA. In one embodiment, the mobile communication device includes: (1) a main body and (2) a camera module, coupled to the main body and configured for rotation relative to the main body about at least one axis of rotation. In another embodiment, the main body has a camera module mechanical interface, the camera module has a main body mechanical interface that is complementary to the camera module mechanical interface and the camera module is configured to be removably coupled to the main body and further configured for rotation relative to the main body about at least one axis of rotation. Thus, the main body and the camera body are unitary in the former embodiment and decouplable from one another in the latter embodiment.

In more specific embodiments, the camera module is motor-driven, such that it pans through a given angle at a given rate of angular speed and captures images at a given rate. The resulting images thus relate to one another in a known way and can be automatically composited within the mobile telecommunication device without requiring manual intervention by the user.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
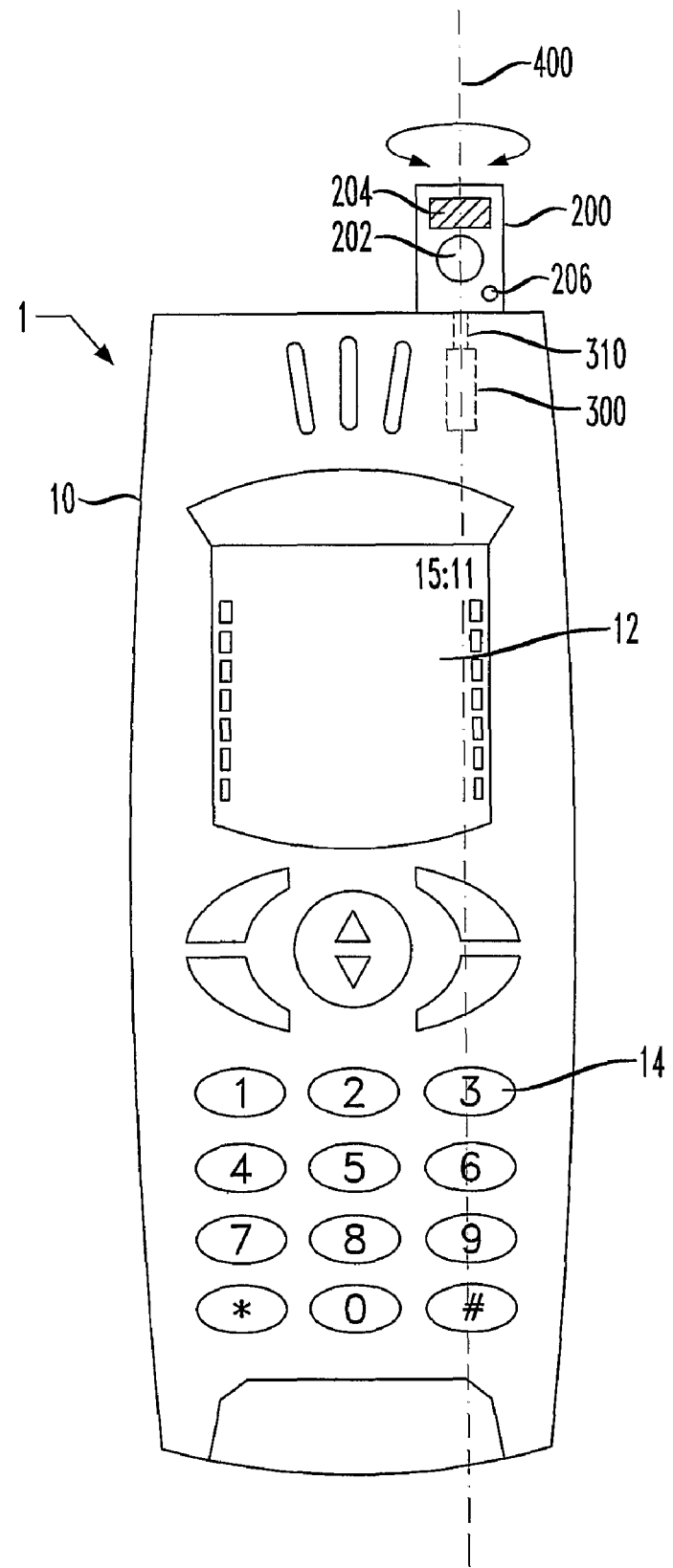
FIG. 1 illustrates a front view of one embodiment of a mobile communication device having a rotatable camera module and constructed according to the principles of the present invention.

Referring initially to FIG. 1, illustrated is a front view of a preferred embodiment of an inventive mobile communication device 100 having a rotatable camera module 200 and constructed according to the principles of the present invention. In the illustrated embodiment, the camera module 200 is automatically rotatable about an axis of rotation 400 through angles up to and exceeding 360°. However, those skilled in the pertinent art will understand that angular excursions less than 360° fall within the broad scope of the present invention. The automatic rotation is achieved in the illustrated embodiment by means of a motor 300, which is connected to the camera module 200 by a drive shaft 310.

In the illustrated embodiment, the camera module 200 comprises a flash 204 and a self-timer, which is connected to a light-emitting diode (LED) 206 for indicating an elapse of the delay time of the self-timer.

The camera module 200 is shown with the lens 202 facing a back side of the mobile communication device 100, the front side being defined as the side of the mobile communication device 100 on which the display 120 and the keypad 140 are arranged. This is a typical position suitable for taking standard digital photos or video clips.

The camera module 200 shown in FIG. 1 is mounted at a top side of the main body 110. Of course, the camera module 200 could also be mounted at the side of the main body 110 or at any position, in which it can be automatically rotated.

Certainly, the invention is not limited to mobile telephones, but can also be used for personal digital assistants (PDA) or mobile digital assistants (MDA) or any other conventional or later-developed mobile communication device.

Figure 2A:
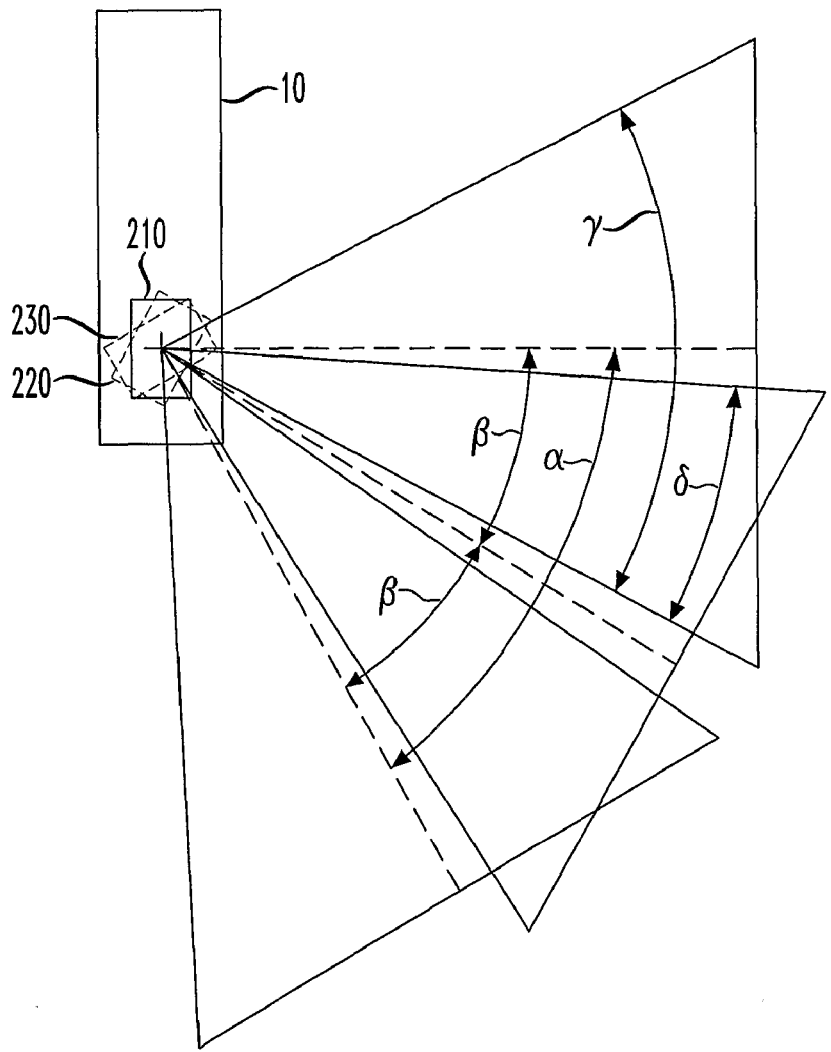
FIG. 2A illustrates a top view of the mobile communication device of FIG. 1 showing in particular the camera module in progressive positions, in which a series of standard images for a panoramic image is captured.

Turning now to FIG. 2A, illustrated is a top view of the mobile communication device of FIG. 1 showing in particular the camera module 200 in progressive positions, in which a series of standard images for a panoramic image are captured. Three of the positions, which are relative to the main body 110 of the mobile communication device (100 of FIG. 1) are designated 210, 220, 230. For each position, a corresponding angle of view γ is shown.

To generate a panoramic image, the camera module 200 rotates through the user-defined angle α from the first position 210 through the second position 220 to the third position 230. In each position 210, 220 and 230 a standard digital photograph is taken. In this example, the automatic rotation of the camera module is performed in two steps, each of angle β.

The number of steps and the value of β needed for the panoramic image is calculated by a software program integrated in the mobile communication device (100 of FIG. 1). For this purpose, the user defines a value for the total angle of rotation a before the capturing process is started, for instance by entering the value by means of the keypad 140. Furthermore, a minimal value for the relative overlap of the view of two consecutive images is defined. This value for instance can be predefined and stored in a memory of the mobile communication device 100 or can also be entered by the user.

In the example shown in FIG. 2A the angle α has a value of 60°, the relative overlap is defined to be 40% and the angle of view γ of the camera module has a value of 50°. Angle β is made smaller than angle γ for a non-zero overlap. The relative overlap is given by δ/γ with δ being the difference between angles γ and β, i.e., δ=γ−β. Thus, in this example angle β has a value of 0.6 γ, i.e., 30°, resulting in two steps of angle β needed for the rotation through angle α and therefore three standard images needed to generate the panoramic image. For larger angles α, more steps are performed and more standard images are captured. The actual step of generating the panoramic image from the captured standard images is performed by means of an image-stitching software program stored in a memory of the mobile communication device.

The resulting panoramic image is stored in a memory of the mobile communication device and can then be displayed on the display 120 or sent via email or MMS (Multimedia Messaging Service) to another mobile communication device, as the user may desire.

Figure 2B:
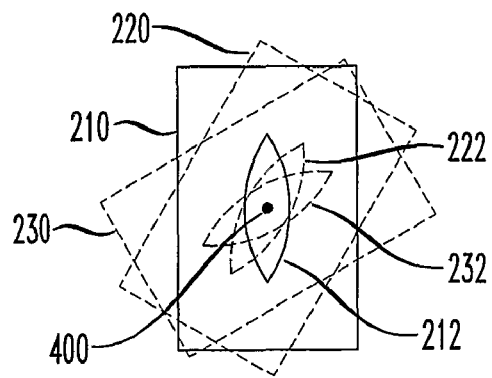
FIG. 2B illustrates an enlarged view of the camera module of FIG. 2A.

Turning now to FIG. 2E, illustrated is an enlarged view of the camera module of FIG. 2A. FIG. 2B shows the positions of the optical lens of the camera module for the positions shown in FIG. 2A. If the camera module 200 is in one of the positions 210, 220 or 230, the optical lens 202 is in one of the respective positions 212, 222 or 232. In the embodiment of FIG. 2B, the optical center of the lens 202 is located essentially on the axis of rotation 400 in each of the positions 212, 222 and 232. That way it is achieved that the optical center of the lens is fixed in space during rotation, thereby reducing possible perspective distortions in a panoramic image.

Figure 3:
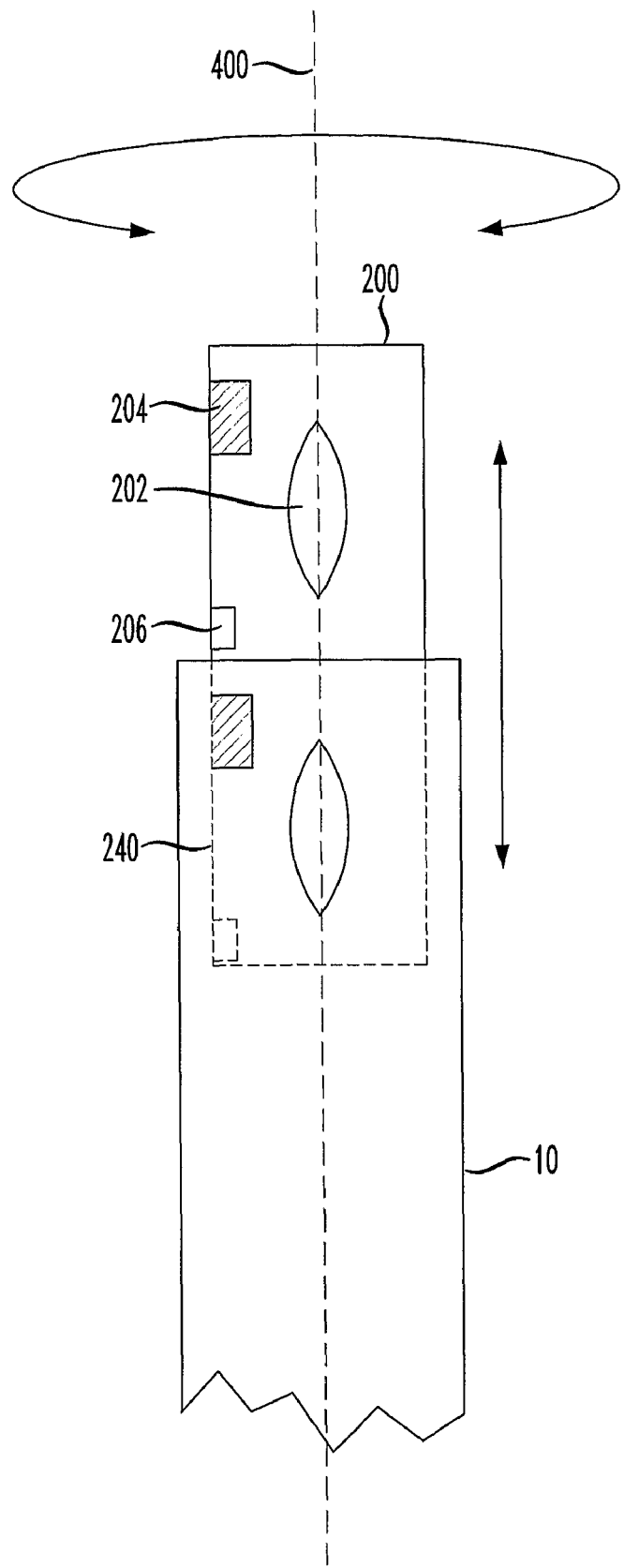
FIG. 3 illustrates a side view of a mobile communication device having a camera module that is retractable into the main body of the mobile communication device.

Turning now to FIG. 3, illustrated is a side view of a mobile communication device having a camera module 200 that is configured to be coupled to and decoupled from the main body 110 of a mobile communication device 100. The camera module 200 has a main body mechanical interface complementary to a camera module mechanical interface (both interfaces are schematically represented by a double-headed arrow spanning the main body 110 and the camera module 200.

In the illustrated embodiment, the camera module 200 is retractable from an exposed position into a retracted position 210. In the retracted position 240, the camera module 200 is protected against external influences. For user convenience, the camera module 200 can include a spring mechanism, by which the camera module 200 can be automatically ejected and brought into the exposed position. For this purpose also retaining means can be provided, which hold back the spring until released by the user.

In the illustrated embodiment, the camera module 200 further comprises a flash 204 and a self-timer, which is connected to a LED 206 for indicating the elapsing of the delay time of the self-timer.

Although the present invention has been described in detail, those skilled in the art should understand that they can make various changes, substitutions and alterations herein without departing from the spirit and scope of the invention in its broadest form.

What is claimed is:

1. A mobile telephone, comprising:
   a main body having a camera module mechanical interface;
   a camera module having a main body mechanical interface complementary to said camera module mechanical interface, said complementary interfaces configured to allow said camera module to be moved from an exposed position to a retracted position, said camera module configured for rotation relative to said main body about at least one axis of rotation when said camera module is in said exposed position;
   means for automatically rotating said camera module about said at least one axis of rotation through a userdefinable first angle α in at least two steps, each step comprising an angular displacement of essentially a second angle β, wherein said second angle β is smaller than said angle of view γ of said camera module and said second angle β has a value of about 60% of said angle γ;

means for capturing a series of images with said camera module by capturing one image before rotating said camera module, capturing one image between each two consecutive steps of rotation and capturing one image after rotating said camera module;

a memory with a stored image-stitching software program for generating a panoramic image from said series of images by stitching together said series of images and a microprocessor by which said image-stitching software program can be executed; and a memory for storing said panoramic image for display.

2. The mobile telephone as recited in claim 1 wherein a relative overlap between each image of said series of images is predefined and stored in said memory.

3. The mobile telephone as recited in claim 1 wherein said camera module is rotatable about at least 360°.

4. The mobile telephone as recited in claim 1 further comprising means for capturing a video sequence with said camera module during rotation of said camera module through said first angle α by capturing a plurality of images with a given frequency.

5. The mobile telephone as recited in claim 1 wherein said camera module is movable with respect to said main body between said retracted and said exposed position, in particular by means of a translatory movement.

6. The mobile telephone as recited in claim 1 further comprising user-releasable retaining means for holding said camera module in said retracted position and transporting means to automatically transport said camera module from said retracted position to said exposed position.

7. The mobile telephone as recited in claim 1 further comprising a display configured to display said panoramic image.

8. A mobile telephone, comprising:

a main body having a camera module mechanical interface;

a camera module having a main body mechanical interface complementary to said camera module mechanical interface, said complementary interfaces configured to allow said camera module to be moved from an exposed position to a retracted position, said camera module configured for rotation relative to said main body about at least one axis of rotation when said camera module is in said exposed position;

means for entering a first angle α for rotating said camera module about said at least one axis of rotation;

means for calculating a second angle β and a number of steps for rotating said camera module through said first angle α at said second angle β for each of said steps;

means for automatically rotating said camera module said number of steps about said at least one axis of rotation at said second angle β;

means for capturing a series of images with said camera module by capturing one image before rotating said camera module, capturing one image between each two consecutive steps of rotation and capturing one image after rotating said camera module, wherein said calculating is based on said first angle α and a relative overlap between each image of said series of images and wherein said first angle α is user-defined and entered employing said means for entering; and a memory with a stored image-stitching software program for generating a panoramic image from said series of images by stitching together said series of images and a microprocessor by which said image-stitching software program can be executed.

9. The mobile telephone as recited in claim 8 further comprising a memory for storing said panoramic image for display.

10. The mobile telephone as recited in claim 8 wherein said means for calculating determines said second angle β from the equation β=γ(1−(said relative overlap)) where γ is an angle of view of said camera module.

11. The mobile telephone as recited in claim 8 wherein said relative overlap is user-defined and entered by a user employing said means for entering.

* * * * *